United States Patent [19]

Kato et al.

[11] 4,401,930
[45] Aug. 30, 1983

[54] METHOD OF SENSING POSITION OF MOVABLE BODY AND APPARATUS THEREFOR

[75] Inventors: Yoshito Kato; Hideyuki Matsubara; Toshio Hashimoto, all of Aichi, Japan

[73] Assignee: Toyota Jidosha Kogyo Kabushiki Kaisha, Toyota, Japan

[21] Appl. No.: 221,266

[22] Filed: Dec. 30, 1980

[51] Int. Cl.³ ............................................ G05B 19/28
[52] U.S. Cl. .................................. 318/603; 318/626; 318/467; 364/474
[58] Field of Search ............... 318/467, 468, 603, 626; 364/474

[56] References Cited

U.S. PATENT DOCUMENTS

| | | | |
|---|---|---|---|
| 3,445,640 | 5/1969 | Harrison et al. | 318/626 X |
| 4,023,084 | 5/1977 | Owa | 318/603 |
| 4,266,171 | 5/1981 | Mashimo | 318/603 X |
| 4,322,669 | 3/1982 | Fukuma | 318/626 X |
| 4,345,131 | 8/1982 | Semon et al. | 318/626 X |

OTHER PUBLICATIONS

"Programmable Limit Switch", Catalog, date appears to be Mar. 16, 1978.

Primary Examiner—B. Dobeck
Attorney, Agent, or Firm—Cushman, Darby & Cushman

[57] ABSTRACT

The present invention relates to improvements in a method of sensing a position of a movable body by directly or indirectly converting a unit movement of the movable body into digital pulse signals and an apparatus therefor. A reference position is selected at a point, at which said movable body abuts against and presses a stopper provided at a specific position within the moving range thereof. The pulse signals are counted as the movable body moves from the stopper using the reference position as a reference number. The coincidence of the number of the pulse signals counted with a first predetermined pulse number corresponding to a predetermined position is sensed so as to sense the fact that the movable body has reached a predetermined position and position sensing signals are emitted. Further, as necessary, the position sensing signals that have been emitted are sustained for the duration of a second predetermined pulse number corresponding to a predetermined stroke preset so that the position sensing signals indicate that the movable body has reached the predetermined position and is within a predetermined stroke from the predetermined position.

11 Claims, 7 Drawing Figures

METHOD OF SENSING POSITION OF MOVABLE BODY AND APPARATUS THEREFOR

BACKGROUND OF THE INVENTION

1. Field of the Invention

The present invention relates to a method of sensing a position of a movable body and an apparatus therefor, and more particularly to improvements in a method of sensing a position of a movable body by directly or indirectly converting a unit movement of the movable body into digital pulse signals and an apparatus therefor, suitable for sensing that a workpiece and a tool have reached predetermined relative positions so as to switch the control of approach means, particularly for use in a machine tool, industrial machine or the like.

2. Description of the Prior Art

Since the approach speed of the tool and the like are controlled in accordance with the positional relationship between a workpiece and a tool, i.e., the progress of working in tool machines and industrial machines in general, it is very important to accurately sense the position of the tool or the like. Consequently, heretofore, as shown in FIG. 1 for example, in a machine tool including: a slide base 14 fixedly provided for working a workpiece 12 fixed on a jig 10; a slide table 18 supporting spindles 16 and movable in the forward and backword directions on the slide base 14; a DC motor 24 for moving the slide table 18 forward or backward by rotating a feed shaft 22 threadably coupled to a feed nut 20 solidly secured to the undersurface of the slide table 18; a DC motor driving circuit 26 for controlling the rotational direction and the rotational speed of the DC motor 24; a speed change setting circuit 28 for supplying a setting value of an approach speed properly suitable for the forwarded positions of the spindles 16 to the DC motor driving circuit 26; and a mechanical sequence circuit 30 for controlling the DC motor driving circuit 26; the slide table 18 is provided at predetermined positions on the side surface thereof with dogs 32 and the slide base 14 is provided at predetermined positions thereof with mechanical limit switches 34 adapted to be ON-OFF operated by the dogs 32, whereby the limit switch 34 is ON-OFF operated by the dogs 32 to sense the forwarded position of the slide table 18, i.e., the spindles 16, so that the DC motor driving circuit 26 can be controlled through the mechanical sequence circuit 30, thereby enabling to control the approach of the slide table 18. In the drawings, designated at 35 is a bearing, 36 a stopper solidly secured to the front end face of the slide table 18, 37 a dead stopper solidly secured to the inner wall surface of the slide base 14, $CR_1$ and $CR_2$ normal-opposite rotation switching contacts for switching the rotational direction of the DC motor 24, and $LS_1 \sim LS_4$ approach speed changing contacts for changing the approach speed in accordance with the progress of working.

This method has such characteristic features that it is very simple to effect the method and it suffices to provide the mechanical limit switches 34 and dogs 32, both of which substantially correspond in number to required signal outputs at positions where controls are required to be switched. However, the mechanical limit switches are low in mechanical strength and not satisfactorily protected from the atmospheric conditions at the sites of factory such as oil, water, dust and the like, and hence, tend to malfunction due to the presence of chips, dust, cooling water and the like, thus lacking in reliability. Furthermore, the positional relationship between the limit switches and the dogs tends to go out of order with age and it is difficult to adjust the dogs. Further, there is little disadvantage in the use of a single purpose machine in which a single workpiece is worked on by use of a single spindle. However, in the use of a general purpose machine having been demanded in recent years in which a plurality of workings are effected on a single workpiece or a plurality of workpieces, there is presented such a disadvantage that the positions of the dogs and limit switches should be changed each time the workpieces or spindles are replaced with new ones, thus lacking in general-purpose properties.

With the machine tools as described above, in the case position sensing singles emitted from the limit switches are directly used in controlling the approach means or the like, the position sensing signal should be emitted not only at the instant the slide table reaches the setting position but also should be emitted when the slide table has reached the setting position and stays within a predetermined stroke from the setting position, the stroke being suitable for controlling the approach. Consequently, in the case point dog is used for switching the limit switch 34 ON for a very limited predetermined period of time for example, heretofore, a self-sustaining circuit has been additionally used so as to sustain the position sensing signals emitted from the limit switches for a predetermined period of time corresponding to a predetermined stroke, or another point dog has been provided at a terminal point of the predetermined stroke so as to ON-OFF operate a single limit switch by use of two point dogs. As a result, the relay sequence has become complicated, reliability has been lowered, and moreover, the costs for manufacture have been increased. On the other hand, in the case a long dog is used which can operate the limit switch 34 for a comparatively long predetermined stroke, there are encountered such disadvantages that not only the long dog is decreased in ridigity but also it is difficult to adjust the long dog, and the change in signal sustaining time requires the long dog to be replaced. The abovedescribed disadvantages are true of the case a proximity switch is used of the limit switch.

On the other hand, with numerically controlled machine tools and the like which have recently been manufactured, digital servomechanisms each provided therein with a positional feedback system have been adopted in many cases. As shown in FIG. 2, this digital servomechanism includes: a pulse generator 40 for directly or indirectly transducing a movement of a movable body 38 such as a slide table into a digital pulse signal; a reversible counter 42 for reversibly counting pulse signals emitted from the pulse generator 40 corresponding to the position of the movable body 38 and supplying a deviation between preset command signal pulses and the pulse signals thus reversibly counted; a D/A converter 44 for converting an output from the reversible counter 42 into an analog signal; and a servoamplifier 46 for amplifying an output from the D/A converter 44 and supplying an output to a servomotor 48 for controlling the position of the movable body 38. The digital servomechanism as described above can monitor the position of the movable body 38 from time to time, and hence, it should lead to that the approach control with a high degree of accuracy can be effected in the ideal condition. However, in actual practice, in the abovedescribed servomechanism, the parts are large in number, the construction is complicated, the manufacturing costs are very high, the components are low in reliability and backlash and the like in transmission system contribute to unstable operation of the servomechanism. Further, there is presented such a disadvantage that a considerable scale of reconstruction is required before the servomechanism having the positional feedback system can be fitted to the conventional machine tool.

SUMMARY OF THE INVENTION

The present invention has been developed in view of the abovedescribed disadvantages of the prior art and has as its first object the provision of a method of sensing a position of a movable body and an apparatus therefor, wherein the position of the movable body can be reliably sensed without using mechanical limit switches being low in reliability or a complicated servomechanism, the apparatus can be readily assembled into a machine tool or the like, and moreover, the manufacturing costs can be reduced.

The present invention has its second object the provision of a method of sensing a position of a movable body and an apparatus therefor, wherein the position of the movable body can be reliably sensed without using mechanical limit switches being low in reliability or a complicated servomechanism, and position sensing signals can be sustained for a predetermined stroke.

The present invention has achieved the aforesaid first object by providing a method of sensing a position of a movable body by directly or indirectly converting a unit movement of the movable body into digital pulse signals, wherein said method includes: a first step of selecting as the reference position a point, at which the movable body abuts against and presses a stopper provided at a specific positon within the moving range thereof and counting the pulse signals using the reference position as the reference number; and a second step of sensing the coincidence of the number of the pulse signals counted in the first step with a first predetermined pulse number corresponding to a predetermined position so as to sense the fact that the movable body has reached the predetermined position. According to the present invention, the position of the movable body can be sensed in noncontact manner with a high degree of accuracy for a long period of time without using mechanical limit switches, a complicated servomechanism is not required, the apparatus as a whole is rendered compact to reduce the manufacturing costs, and the change of control switching points from one to another is facilitated, so that a multiple types of controls can be performed by one and the same apparatus.

In the aforesaid first step, in resetting the counted number of the pulse signals at the reference position as the reference number, when the movable body returns to the reference position, irrespective of what the counted number of the pulse signals, the movable body is adapted to abut against and press the stopper under a substantially constant force and continue its movement until the pulse signals cease from being supplied, and the counted number of the pulse signals at this time is reset as the reference number, thus enabling to further increase the accuracy in sensing the position.

Or, in the aforesaid step, in resetting the counted number of the pulse signals at the reference position as the reference number, when the counted number of the pulse signals at the time of being ceased from being supplied is out of the preset tolerance limits, off signals are adapted to be issued, thus facilitating to locate a fault.

Furthermore, the present invention has achieved the aforesaid second object by providing a method of sensing a position of a movable body by directly or indirectly converting a unit movement of the movable body into digital pulse signals, wherein said method includes: a first step of counting the pulse signals; a second step of sensing the coincidence of the counted number of the pulse signals counted in the first step with a first predetermined pulse number corresponding to a predetermined position preset so as to issue position sensing signals; and a third step of sustaining the position sensing signals emitted in the second step for the duration of a second predetermined pulse number corresponding to a predetermined stroke preset so as to sense the fact that the movable body has reached a predetermined position and stays within a predetermined stroke from the predetermined position. According to the present invention, the fact that the movable body has reached the predetermined position and stays within the predetermined stroke from the predetermined position can be reliably sensed without using mechanical limit switches low in operating reliability, self-sustaining circuit, long dog or the like, and further without using a complicated, expensive servomechanism. Moreover, the change of the predetermined positions and the change of the predetermined strokes can be performed by rewriting of Random Access Memory (hereinafter referred to as "RAM") or the like of the limit detecting circuit, thus rendering general purpose properties.

According to the present invention, in an apparatus for sensing a position of a movable body for use in a machine tool including: a slide base fixedly provided; a slide table movable on the slide table in the forward and backward directions; a DC motor for moving the slide table forward or backward by rotating a feed shaft threadably coupled to a feed nut solidly secured to the slide table; a DC motor driving circuit for controlling the rotational direction and rotational speed of the DC motor; a speed change setting circuit for supplying a proper approach speed setting value in accordance with the forwarded position of the slide table to the DC motor driving circuit; and a mechanical sequence circuit controlling the DC motor driving circuit, wherein said apparatus further includes: a dead stopper solidly secured to the inner wall surface of the slide base; a rotary encoder for detecting a rotation of the feed shaft corresponding to a movement of the slide table; and a limit detecting circuit for sensing an approach position of the slide table in accordance with an output from the rotary encoder and supplying same to a mechanical sequence circuit.

Additionally, the rotary encoder includes a pair of photoelectric elements spaced apart from each other through 90° in phase.

Or, the aforesaid limit detecting circuit is made to include: an encoder input circuit for receiving an output from the rotary encoder; an input circuit for receiving a command during an output emitted from the mechanical sequence circuit; an output circuit; an indicator circuit; a peripheral interfence capable of programming; a central operation processing unit; a Read Only Memory; a Random Access Memory in which a predetermined pulse number is written and stored; and a bus for connecting the abovedescribed various components to one another.

BRIEF DESCRIPTION OF THE DRAWINGS

The abovementioned features and objects of the invention of the present application will become more apparent by reference to the following description taken in conjunction with the accompanying drawings, wherein like referenced numerals denote like elements, and in which.

DETAILED DESCRIPTION OF THE INVENTION

Detailed description will hereunder be given of embodiments of the present invention with reference to the drawings.

Figure 1:
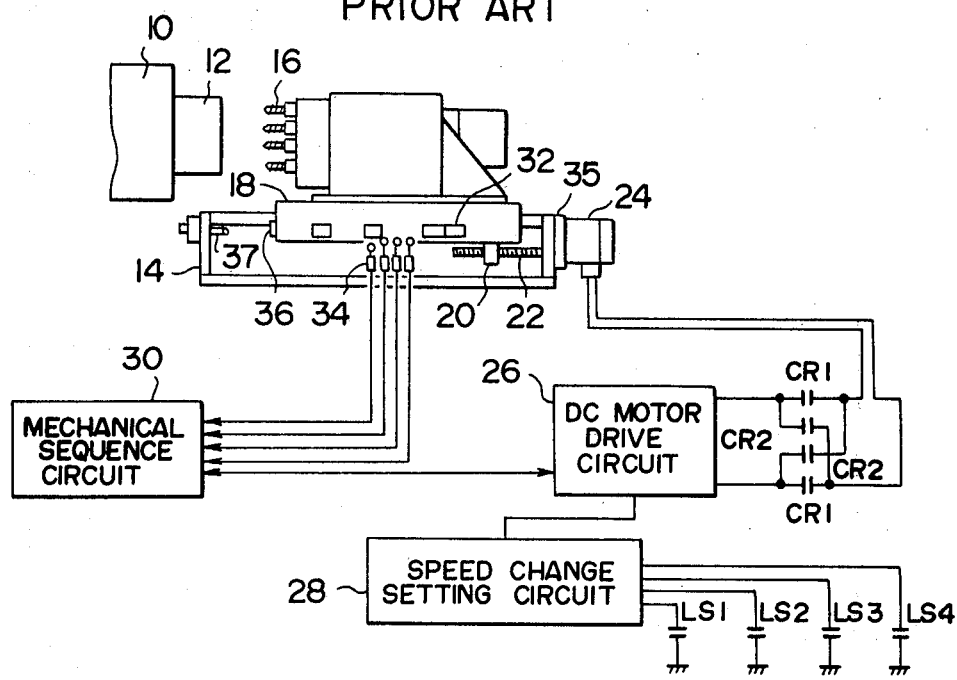
FIG. 1 is a block diagram showing the arrangement of one example of the approach control device of the machine tool in which the conventional mechanical limit switches are used.
Figure 2:
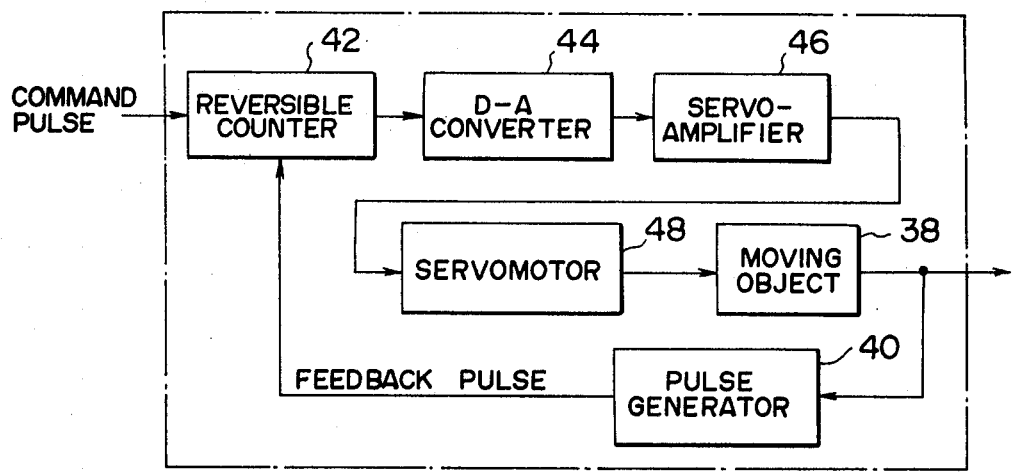
FIG. 2 is a block diagram showing the arrangement of one example of the servomechanism provided therein with the conventional position feedback system.
Figure 3:
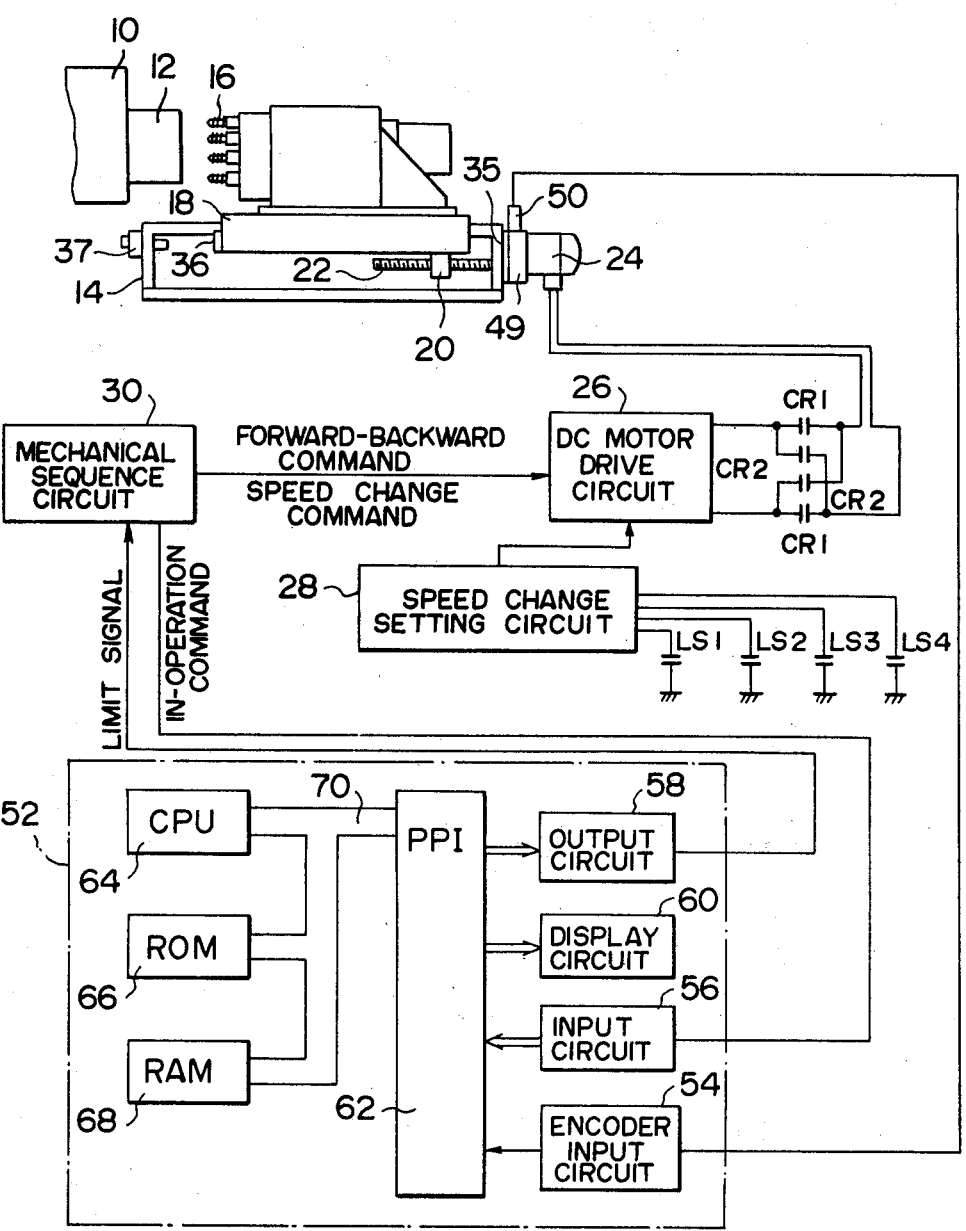
FIG. 3 is a block diagram showing the arrangement of the feed control device adopting an embodiment of the method for sensing positions of movable bodies according to the present invention.

A first embodiment of the present invention is applied to the conventional machine tool shown in FIG. 1. As shown in FIG. 3, the first embodiment includes: a rotary encoder 50 for detecting a rotation of a feed shaft 22 corresponding to a movement of a slide table 18 from a gear coupling 49; and a limit detecting circuit 52 for detecting an approach position of the slide table 18 in accordance with an output from the rotary encoder 50 and supplying an output to a mechanical sequence circuit 30; in place of dogs and limit switches. Other respects are similar to those of the conventional example as shown in FIG. 1, so that detailed description thereof will be omitted.

Figure 4:
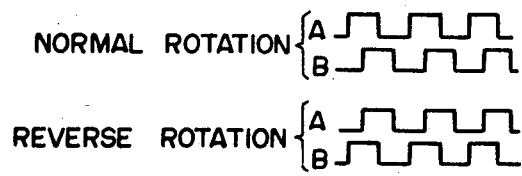
FIG. 4 is a chart showing output waveshapes of the rotary encoder in the abovedescribed embodiment.

For example, the rotary encoder 50 includes a pair of photoelectric elements provided about a gear of a gear coupling of the DC motor 24 being spaced apart from each other through 90° in phase, and adapted to supply two pulse signals different in phase depending on the rotational direction of the feed shaft 22, i.e., the approach direction of the slide table 18 as shown in FIG. 4 to the limit detecting circuit 52.

The limit detecting circuit 52 includes: an encoder input circuit 54 for receiving an output from the rotary encoder 50; an input circuit 56 for receiving a command during an output emitted from the mechanical sequence circuit 30; an output circuit 58; an indicator circuit 60; a peripheral interface (hereinafter referred to as "PPI") 62; a central operation processing unit (hereinafter referred to as "CPU") 64; a Read Only Memory (hereinafter referred to as "ROM") 66; a RAM 68; and a bus for connecting the abovedescribed components to one another. In RAM 68 of this limit detecting circuit 52, first preset pulse numbers $P_1 \sim P_4$ corresponding to control change positions $P_1 \sim P_4$ are written in and stored by a program module separately prepared.

Figure 5:
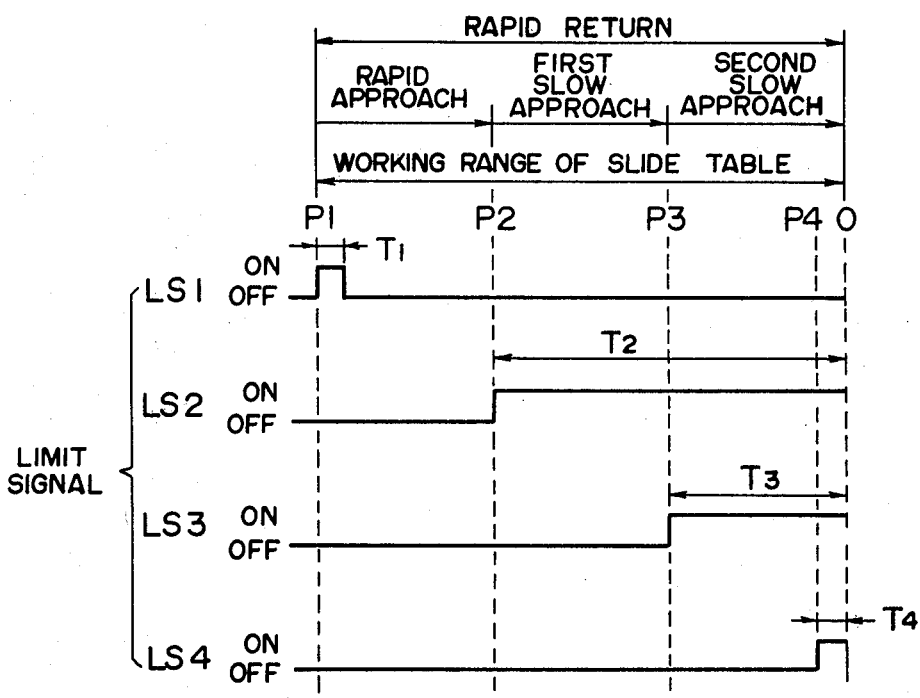
FIG. 5 is a chart showing the feed rate control conditions of the slide table in the abovedescribed embodiment.
Figure 6:
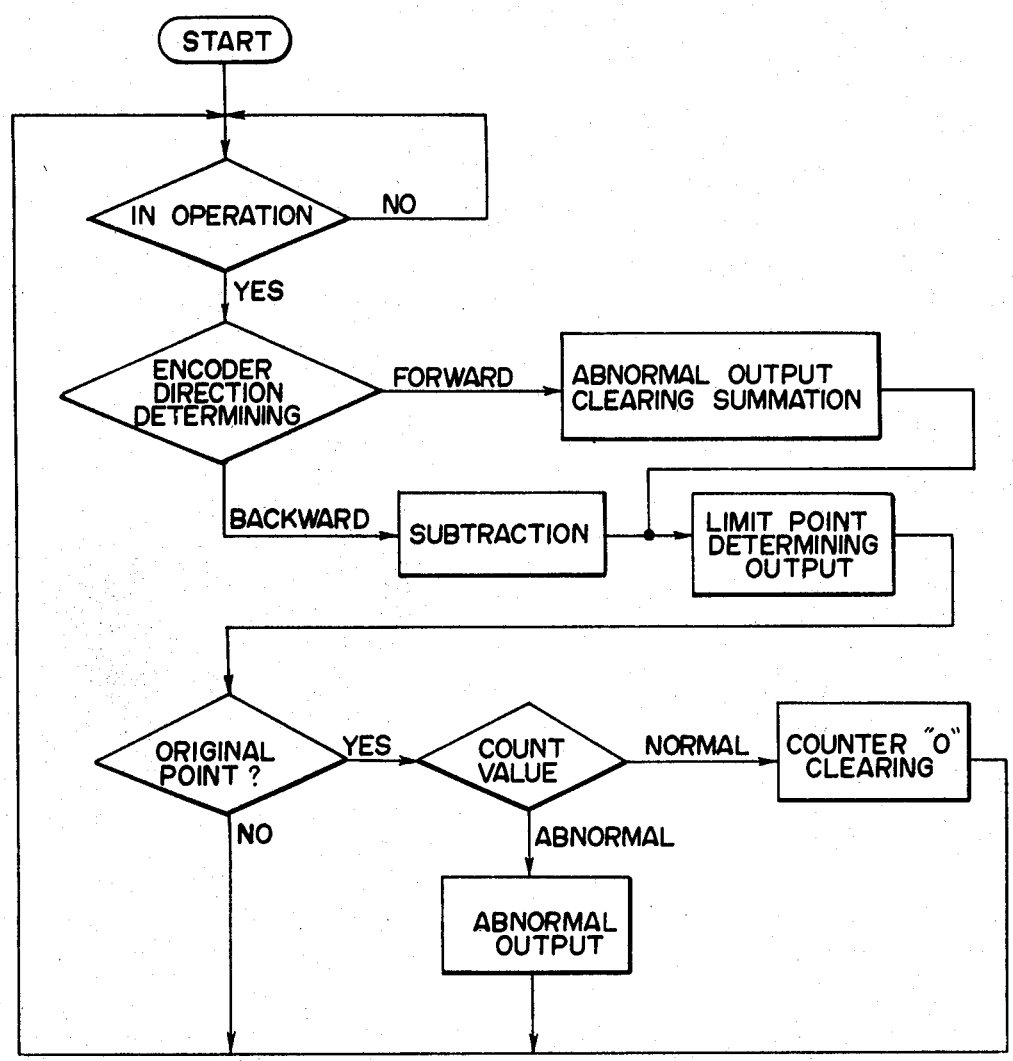
FIG. 6 is a flow chart showing the action of the limit detecting circuit in the abovedescribed embodiment.

Description will hereunder be given of action with reference to FIGS. 5 and 6. A DC motor 24 rotates a feed shaft 22 through a gear coupling 49 to move a slide table 18 secured thereto with a feed nut 20 forward or backward. The slide table 18 is caused to rapid-approach to $P_1 \sim P_2$ in response to limit signals $LS_1 \sim LS_4$ obtained from the limit detecting circuit 52, to first-slow-approach to $P_2 \sim P_3$, to second-slow-approach to $P_3 \sim P_4$, and finally, to rapid-return to $P_4 \sim P_1$ as shown in FIG. 5 for example. These approach speeds are preset in a speed change setting circuit 28, and one of these speeds is selected by opening or closing of a relay in the mechanical sequence circuit 30.

When the feed shaft 22 is rotated by the DC motor 24, the rotary encoder 50, being connected to the gear coupling 49, supplies two output pulses different in phase from each other according to the rotating direction, normal or reverse, as shown in FIG. 4, and received by the encoder input circuit 54 of the limit detecting circuit 52.

As shown in FIG. 6, the limit detecting circuit 52 receives command signals during its operation from the mechanical sequence circuit 30 through the input circuit 56, and is at rest during its non-operation. In the case the mechanical sequence circuit 30 is supplying output signals, the two pulse signals being different in phase through 90° from each other which are emitted from the rotary encoder 50 are discriminated whether they are in the forward direction (the normal rotation of the encoder) or in the backward direction (the reverse rotation of the encoder). In the case the encoder rotates in the normal direction and the slide table 18 moves in the forward direction, abnormal outputs to be described hereinafter from the limit detecting circuit 52 are cleared and the pulse signals from the rotary encoder 50 are summed. While, in the case the encoder supplies the reversed signals and the slide table 18 moves in the backward direction, the number of output pulses supplied from the encoder in accordance with the rearward movement of the slide table 18 is subtracted from the total sum of the pulse signals counted till then. These summed or subtracted result is compared by CPU 64 with the first preset pulse numbers $P_1 \sim P_4$ corresponding to the predetermined positions $P_1 \sim P_4$. When the former and the latter coincide with each other, ON-OFF condition of the limit signals $LS_1 \sim LS_4$ is changed and an output is supplied to the output circuit 58 through PPI 62. By this, the mechanical sequence circuit 30 can be controlled in accordance with the position of the slide table 18. When the working on and a stopper 36 at one side of the slide table 18 reaches an original position where it comes into abutting contact with a dead stopper 37 secured to the end face of a slide base 14, the forward movement of the slide table 18 becomes impossible irrespective of what the rotating torque is, so that no output pulses can be obtained from the rotary encoder 50. Consequently, the condition of the outputs from the rotary encoder 50 disappearing for a certain period of time is determined to be the original position and the counter is reset. At this time, before resetting, it is descriminated whether the counted value of the counter at the time of returning to the original point comes to be about zero or not. More specifically, when the counted value of the counter is above the lower limit of the discrimination value and below the upper limit of the discrimination value, it is discriminated to be a normal operation, the counted value of the counter is reset at zero, rapid return is performed and the succeeding working is started. On the other hand, when the counted value of the counter is less than the lower limit of the discrimination value or over the upper limit of the discrimination value, it is determined that the counted value of the counter is shifted from the actual position of the slide table 18 due to an abnormality in the mechanical or electrical system. Then, an abnormality is indicated by the indicator circuit 60, and an abnormal output is supplied to the mechanical sequence circuit 30 to stop the working.

Additionally, change of the limit signal (the control change signal point) can be readily effected by correcting the data (corresponding to the distance from the original point) of RAM 68 in the limit detecting circuit 52 by a program module separately prepared.

A second embodiment of the present invention will now be described. In this second embodiment, in RAM 68 in the limit detecting circuit 52, there are written and stored not only first preset pulse numbers $P_1 \sim P_4$ corresponding to control change positions $P_1 \sim P_4$ but also second preset pulse numbers $t_1 \sim t_4$ corresponding to predetermined numbers of stroke $T_1 \sim T_4$ for holding limit signals $LS_1 \sim LS_4$ which are position detecting signals corresponding to respective control change positions $P_1 \sim P_4$ when the slide table 18 reaches the respective control change positions $P_1 \sim P_4$ as in the aforesaid first embodiment. Other respects are similar to those of the first embodiment, so that detailed description thereof will be omitted.

Figure 7:
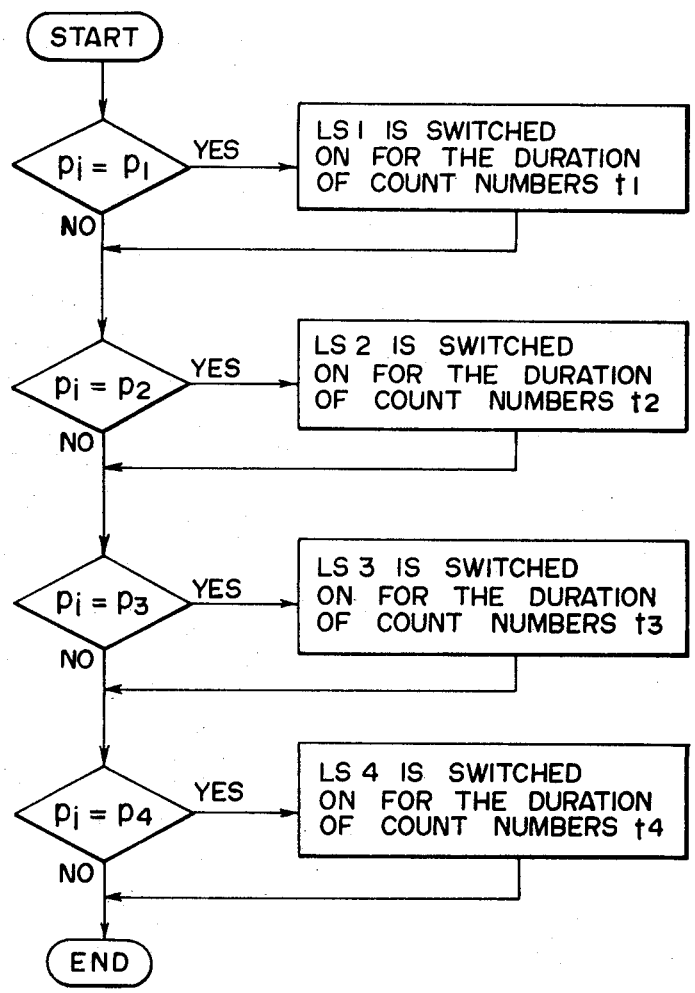
FIG. 7 is a flow chart showing the action of the limit detecting circuit in a second embodiment.

In this second embodiment, limit signals from the limit detecting circuit 52 are supplied according to a flow chart shown in FIG. 7. More specifically, the counted number pi output pulses supplied from the rotary encoder 50 to CPU 64 through the encoder input circuit 54 and PPI 62 becomes a preset pulse number $P_1$ corresponding to a predetermined position $P_1$ preset, the limit signal $LS_1$ is turned ON and this ON condition is held for the duration of a predetermined pulse number $t_1$ corresponding to a predetermined stroke $T_1$ preset in RAM 68. Consequently, a DC motor driving circuit 26 is controlled by a predetermined stroke $T_1$ in response to this limit signal $LS_1$ through the mechanical sequence circuit 30. In the case, the counted number pi counted by CPU 64 coincides with a preset pulse number $p_2$ corresponding to a predetermined position $P_2$ preset, the limit signal $LS_2$ is turned ON, and this ON condition is held for the duration of a predetermined pulse number $t_2$ corresponding to a predetermined stroke $t_3$. Likewise, in the case the counted number pi coincides with a preset pulse number $p_4$, the limit signal $LS_4$ is sustained for the duration of a predetermined pulse number $t_4$. The mechanical sequence circuit 30 is controlled by these limit signals in accordance with the position of the slide table 18. Other respects are similar to those of the first embodiment, so that detailed description thereof will be omitted.

In each of the abovedescribed embodiments, such an instant is not discriminated as the original point that the stopper 36 on the side of the slide table 18 comes into abutting contact with the dead stopper 37, but such a point is discriminated as the original point that the stopper 36 is continuouslly pressed against the dead stopper 37 for a predetermined period of time under a substantially constant force by the torque of the DC motor 24. Hence, errors due to a backlash, return and the like can be minimized. Additionally, in each of the abovedescribed embodiments, the reference position is selected to be the position of work being completed at the forward-most position of the slide table. However, the reference position should not be limited to this but the reference portion may be selected to be the position of return being completed at the rearward-most position of the slide table. Furthermore, in each of the abovedescribed embodiments, the reference positions are selected to be travel-ending positions (i.e., stroke ends) of the slide table 18, however, the reference position should not be limited to these positions, but the reference positions may be selected to be intermediate positions or intermediate working positions where certain working are completed.

Furthermore, in each of the abovedescribed embodiments, two pulse signals having a difference in phase through 90° are adapted to be supplied from the rotary encoder 50, the types of the output signals from the rotary encoder should not be limited to the above, but, in the case a row of single pulses are used as the output signals from the rotary encoder, the mechanical sequence circuit 30 may supply forward and backward commands for discrimination of rotating direction, or the rotary encoder itself may generate pulse signals different from each other in the case of normal or reverse rotation. In this case, the operation of the limit detecting circuit may be more simplified.

Furthermore, in each of the abovedescribed embodiments, the limit signals are incorporated in the mechanical sequence circuit consisting of the relay sequence circuit, but, needless to say, the limit signals may be incorporated in a sequencer which has been widely used in recent years.

Further, in each of the abovedescribed embodiments, the present invention is applied to a machine tool, in which a slide table is controlled in its approach by a DC motor, the scope of applications of the present invention should not be limited to this, but may be likewise applied to generally used machine tools in which the slide table is controlled in its approach by a hydraulic or pneumatic cylinder and the approach speed is changed by switching the flow rate of hydraulic oil or air.

From the foregoing description, it should be apparent to one skilled in the art that the abovedescribed embodiment is but one of many possible specific embodiments which can represent the applications of the principles of the present invention. Numerous and varied other arrangements can be readily devised by those skilled in the art without departing from the spirit and scope of the invention.

What is claimed is:

1. A method of sensing a position of a movable body by directly or indirectly converting a unit movement of a movable body into digital pulse signals, comprising:
   a first step of counting said pulse signals;
   a second step of sensing the coincidence of the number of said pulse signals counted in said first step with a first predetermined pulse number corresponding to a predetermined position preset and generating position sensing signals in response to said coincidence; and
   a third step of sustaining said position sensing signals emitted in the second step after said movable body leaves said predetermined position for the duration of a second predetermined pulse number corresponding to a predetermined stroke, said sustained position sensing signals indicating that said movable body has reached said predetermined position and is within a predetermined stroke from said predetermined position.

2. An apparatus for sensing a position of a movable body for use in a machine tool comprising: a slide base fixedly provided; a slide table movable on said slide table in the forward and backward directions; a DC motor for moving the slide table forward or backward by rotating a feed shaft threadably coupled to a feed nut solidly secured to the slide table; a DC motor driving circuit for controlling the rotational direction and rotational speed of said DC motor; a speed change setting circuit for supplying a proper approach speed setting value in accordance with the forwarded position of the slide table to the DC motor driving circuit; a mechanical sequence circuit for controlling the DC motor driving circuit;
a dead stopper solidly secured to the inner wall surface of said slide base;
a rotary encoder for detecting a rotation of the feed shaft corresponding to a movement of the slide table; and
a limit detecting circuit for sensing an approach position of the slide table in accordance with an output from the rotary encoder and supplying a signal of the approach position to a mechanical sequence circuit.

3. An apparatus for sensing a position of a movable body as set forth in claim 2, wherein said rotary encoder comprises a pair of photoelectric elements spaced apart from each other through 90° in phase.

4. An apparatus for sensing a position of a movable body as set forth in claim 2, wherein said limit detecting circuit comprises:
an encoder input circuit for receiving an output from said rotary encoder;
an input circuit for receiving a command during an output emitted from the mechanical sequence circuit;
an output circuit for generating limits signals;
an indicator circuit;
a peripheral interface capable of programming connected to said encoder input circuit, said command input circuit, said output circuit and said indicator circuit;
a central operation processing unit;
a Read Only Memory;
a Random Access Memory in which a predetermined pulse number is written and stored; and
a bus for interconnecting said peripheral interface, said processing unit, said read only memory and said random access memory.

5. A method of sensing a position of a movable body comprising the steps of:
defining a reference position at which said movable body abuts against a stopper which stops said movable body even if said movable body continues to be driven;
generating digital pulse signals related to incremental movements of said movable body, said digital pulse signals not being produced when said movable body abuts against said stop;
counting said digital pulse signals to produce an indication of the position of said movable body;
resetting said count when said movable body abuts against said stopper irrespective of the actual value of said count; and
sensing the coincidence of said count with a predetermined pulse number corresponding to a predetermined position so as to sense the fact that said movable body has reached said predetermined position.

6. An apparatus for sensing a position of a movable body on a base, comprising:
a motor for moving said movable body;
a stopper for receiving and stopping said movable body at a reference position;
pulse generating means for generating pulse signals in proportion to a distance of movement of said movable body;
counting means for counting said pulse signals;
reference position detecting means for detecting that said pulse signals cease from being generated for a predetermined period of time due to stopping of said movable body by said stopper and resetting said counting means in response thereto;
predetermined position presetting means for presetting a number of said pulse signals corresponding to a predetermined position of said movable body; and
comparing means for detecting that said movable body reaches said predetermined position when a value of said counting means coincides with said number preset by said predetermined position presetting means.

7. An apparatus for sensing a position of a movable body on a base, comprising:
a motor for moving said movable body;
pulse generating means for generating pulse signals in proportion to a distance of movement of said movable body;
counting means for counting said pulse signals;
predetermined positions presetting means for presetting a plurality of numbers of said pulse signals corresponding to a plurality of predetermined positions of said movable body;
predetermined ranges presetting means for presetting a plurality of numbers of said pulse signals corresponding to predetermined ranges from said predetermined positions preset by said predetermined positions presetting means; and
comparing means for detecting that said movable body reaches each of said predetermined positions of said predetermined position presetting means when values of said counting means coincide with said numbers preset by said predetermined position presetting means and for detecting that said movable body is in said ranges preset by said predetermined ranges presetting means until values of said counting means coincide with said numbers preset by said predetermined ranges presetting means.

8. An apparatus for sensing a position of a movable body as set forth in claim 7, further comprising:
a stopper for receiving and stopping said movable body at a reference position; and
reference position detecting means for detecting that said pulse signals cease from being generated for a predetermined period of time due to stopping of said movable body by said stopper and resetting said counting means in response thereto.

9. An apparatus for sensing a position of a movable body as set forth in claim 6, further comprising second comparing means for supplying an output indicating an abnormal situation when said reference position detecting means detects that a value of said counting means falls out of a predetermined range when said movable body has stopped at said stopper.

10. A method of sensing a position of a movable body as set forth in claim 5, wherein said resetting step comprises the step of generating off signals when said actual value of said count exceeds preset tolerance limits.

11. A method of sensing a position of a movable body as set forth in claim 5, wherein said resetting step occurs when said pulse signals are not emitted for a period of time exceeding a predetermined time, so that the position of said movable body is determined to be said reference position.

* * * * *